United States Patent [19]

Kamakura et al.

[11] Patent Number: 4,850,685
[45] Date of Patent: Jul. 25, 1989

[54] PROJECTION-TYPE COLOR DISPLAY DEVICE

[75] Inventors: Hiroshi Kamakura; Tomio Sonehara; Takeshi Ono; Junichi Nakamura; Akitaka Yajima, Suwa; Shuji Aruga, all of Suwa, Japan

[73] Assignee: Seiko Epson Corporation, Tokyo, Japan

[21] Appl. No.: 233,869

[22] Filed: Aug. 18, 1988

Related U.S. Application Data

[63] Continuation of Ser. No. 908,479, Sep. 17, 1986, abandoned, which is a continuation-in-part of Ser. No. 786,438, Oct. 11, 1985.

[30] Foreign Application Priority Data

Oct. 22, 1984 [JP] Japan ................... 59-221556
Jul. 31, 1985 [JP] Japan ................... 60-169442
Nov. 26, 1985 [JP] Japan ................... 60-265289

[51] Int. Cl.$^4$ ........................................... G02B 27/18
[52] U.S. Cl. ................................. 350/397; 350/173; 350/174; 350/401; 353/31; 353/34; 358/61
[58] Field of Search ........... 350/169, 170, 171, 172, 350/173, 174, 397, 398, 400, 401, 402, 403, 404, 331 R, 334, 352; 353/31, 34, 37; 358/60, 61

[56] References Cited

U.S. PATENT DOCUMENTS

| | | | |
|---|---|---|---|
| 1,662,693 | 3/1928 | Astafiev .................... | 350/172 |
| 2,202,257 | 5/1940 | Klaver ..................... | 350/173 |
| 2,737,076 | 3/1956 | Rock, Jr. .................. | 350/173 |
| 2,754,718 | 7/1956 | Rock et al. ................ | 350/173 |
| 2,971,051 | 2/1961 | Back ....................... | 350/173 |
| 3,303,278 | 2/1967 | Beno et al. ................ | 350/173 |
| 3,588,324 | 6/1971 | Marie ...................... | 350/397 |
| 3,704,061 | 11/1972 | Travis ..................... | 350/397 |
| 3,767,290 | 10/1973 | Lang et al. ................ | 350/173 |
| 4,127,322 | 11/1978 | Jacobson et al. ............ | 353/31 |
| 4,191,456 | 3/1980 | Hong et al. ................ | 353/31 |
| 4,448,491 | 5/1984 | Okubo ...................... | 350/334 |
| 4,461,542 | 7/1984 | Gagnon ..................... | 350/401 |
| 4,464,018 | 8/1984 | Gagnon ..................... | 350/331 R |
| 4,500,172 | 2/1985 | Gagnon et al. .............. | 350/331 R |
| 4,687,301 | 8/1987 | Ledebuhr ................... | 350/401 |
| 4,690,526 | 9/1987 | Ledebuhr ................... | 353/31 |

FOREIGN PATENT DOCUMENTS

| | | | |
|---|---|---|---|
| 1096635 | 1/1961 | Fed. Rep. of Germany ...... | 350/171 |
| 1560501 | 2/1969 | France ..................... | 350/173 |
| 48-79596 | 10/1973 | Japan . | |
| 60-2916 | 6/1983 | Japan . | |
| 60-3291 | 6/1983 | Japan . | |
| 60-179723 | 9/1985 | Japan . | |
| 475415 | 11/1937 | United Kingdom ............ | 350/173 |

Primary Examiner—Rodney B. Bovernick
Assistant Examiner—Martin Lerner
Attorney, Agent, or Firm—Blum, Kaplan, Friedman, Silberman & Beran

[57] ABSTRACT

A projection-type color display device. The display device includes a light source which provides light and a color separation member which receives the light and which separates the received light into the different colors of red, blue and green light. A light valve device receives the red, blue and green light and modulates the light to produce images. A color synthesis cube prism synthesizes the three monochromatic lights modulated by the light valve. A projection lens system projects the synthesized image onto a screen for viewing.

12 Claims, 10 Drawing Sheets

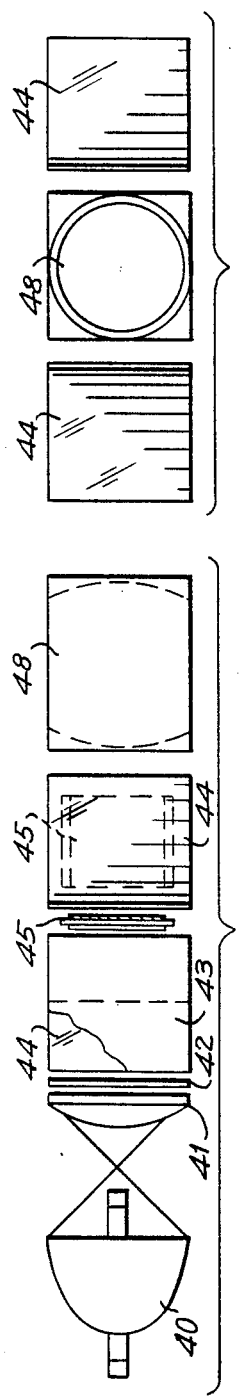
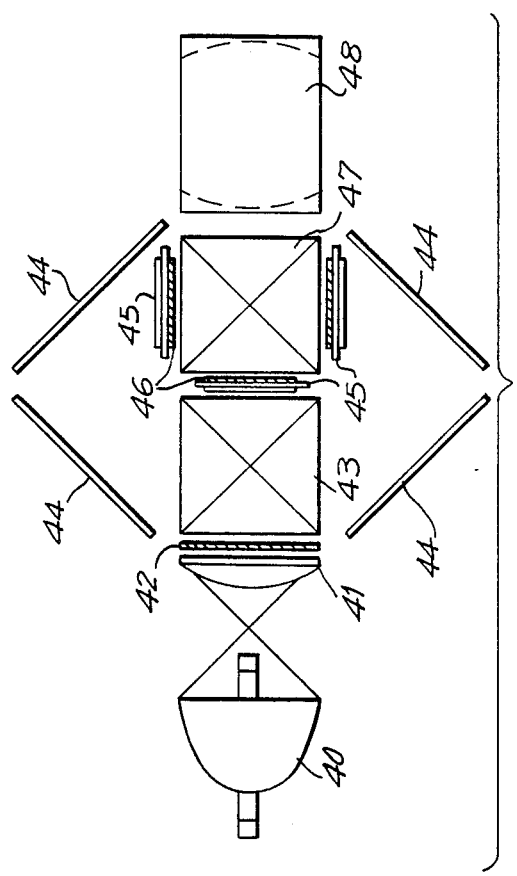

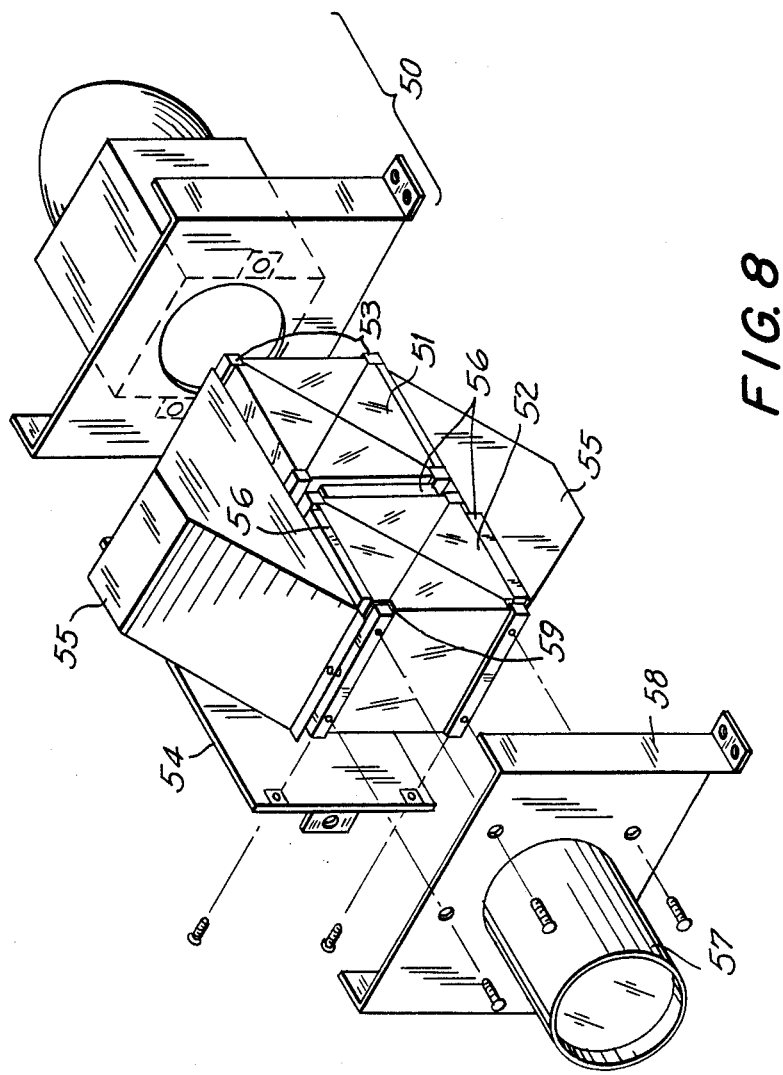

PROJECTION-TYPE COLOR DISPLAY DEVICE

CROSS REFERENCE TO RELATED APPLICATION

This is a continuation of application Ser. No. 06/908,479, filed Sept. 17, 1986 now abandoned which itself is a continuation-in-part application of U.S. patent application Ser. No. 06/786,438, filed on Oct. 11, 1985.

BACKGROUND OF THE INVENTION

The present invention relates generally to a projection-type color display device and, in particular, to a projection-type display device which uses a color synthesis cube prism to synthesize separate, modulated monochromatic lights for improving the projection of images.

Conventional projection-type display devices have synthesized only monochromatic images through the use of reflective light-valves and dichroic mirror groups, for example, as disclosed in Japanese Laid-Open patent application No. 58-180937.

The conventional projection-type color display devices have several deficiencies. In a device using reflecting light valves, first, the reflected light at the surface of the light valve causes deterioration of the contrast of the displayed images. Second, since the light-valves are addressed by the light from a cathode ray tube (CRT), the device is required to be large. Third, an excellent polarized light separation quality of the dichroic mirror is required.

The present invention was developed to solve the aforenoted problems. Accordingly, it is desired to provide an improved projection-type color display device.

SUMMARY OF THE INVENTION

Generally speaking, in accordance with the present invention, a projection-type color display device is provided. The projection-type color display device includes a light source for producing light and a color separation mechanism for receiving the light and for separating the received light into the different colors of red, blue and green light. First, second and third light valves receive respectfully the red, blue and green transmissive light and modulate such light. Alternatively, a single light valve may be utilized. A color synthesis cube prism synthesizes the three monochromatic lights modulated by the light valve to produce a synthesized image. A projection lens projects the synthesized image onto a screen or the like.

The proposed color synthesis cube prism generally has the same selective reflection characteristics as a color separation cube prism. Light energy can be effectively utilized by separating, modulating and synthesizing the colored light by means of the color synthesis cube prism.

Accordingly, it is an object of the present invention to provide an improved projection-type color display device.

Another object of the present invention is to provide a compact projection-type color display device.

A further object of the present invention is to provide a projection-type color display device which is excellent in the contrast of the pictures and in the utilizing efficiency of the light from a single light source.

A still further object of the present invention is to provide a projection-type color display device which utilizes a color synthesis cube prism to synthesize the separate colored lights.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 7A, 7B and 7C are a front view, top plan view and side view, respectively, of the projection-type color display device constructed in accordance with the present invention;

FIG. 8 is an exploded perspective view of a projection-type color display device in accordance with the present invention;

DESCRIPTION OF THE PREFERRED EMBODIMENTS

Figure 1:
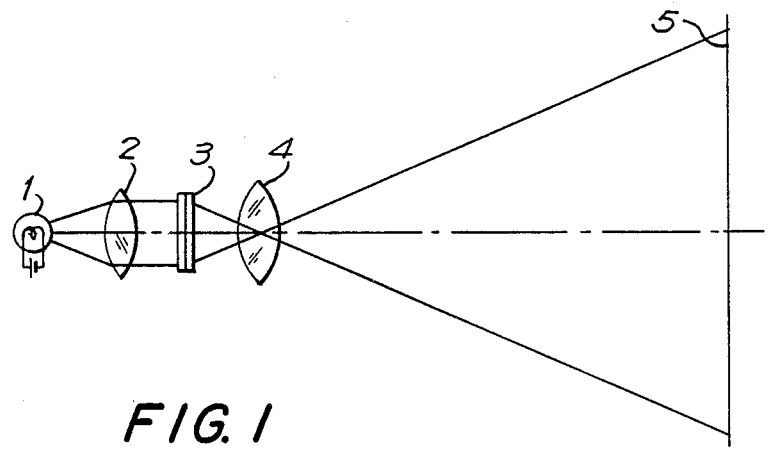
FIG. 1 is a schematic diagram for explaining the principles of operation of the projection-type color display device according to the present invention.

Reference is first made to FIG. 1 of the drawings which will be utilized to explain the principles of a projection display device in accordance with the present invention. Light from a light source 1 is collimated by a condenser lens 2 and irradiated to a light valve 3 which produces an image. The image produces by light valve 3 is enlarged by a projection lens 4 and projected onto a screen 5 for viewing.

Figure 2A:
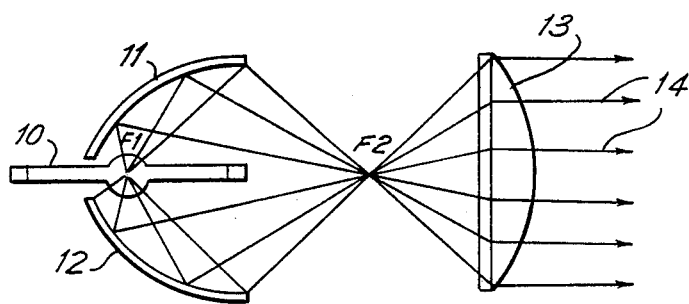
FIG. 2A is a sectional view showing the construction of the illumination system used in conjunction with the projection-type color display device of the present invention.
Figure 2B:
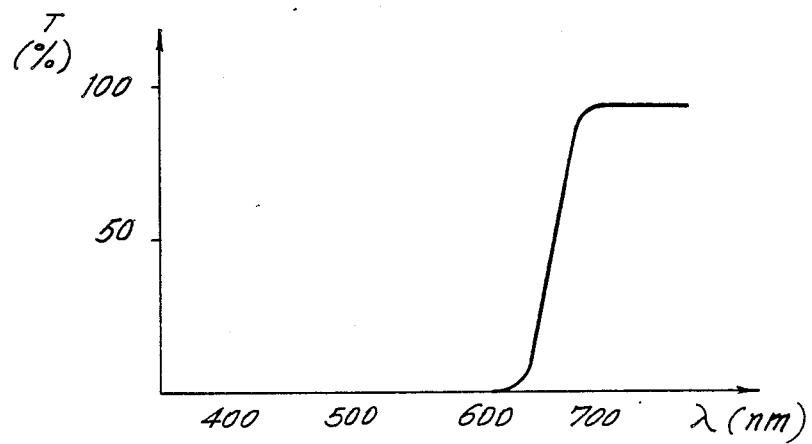
FIG. 2B is a graph showing the spectoscopic characteristics of the reflector used in conjunction with the present invention.

Referring now to FIGS. 2A and 2B, the illumination system used in conjunction with the present invention will be described. A high RA lamp 10 such as a halogen lamp, metal haloid lamp or a xenon lamp may be utilized. An oval mirror 11 is positioned so that luminescence point 12 may be become the first focus F1. Light is focused on the second focus F2 and light flux 14 is collimated by a condenser lens 13. The illumination system is constructed so that heat is barely transmitted towards the front thereof. Infrared rays are transmitted as shown in the graph of FIG. 2B by using a cold mirror for oval mirror 11.

Figure 3A:
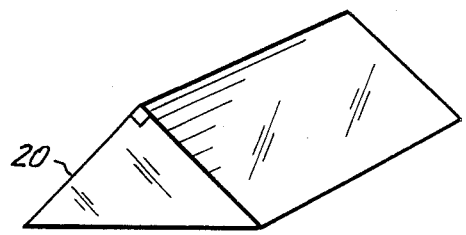
FIG. 3A is a perspective view of a rectangular prism used in the cube prism of the present invention.
Figure 3B:
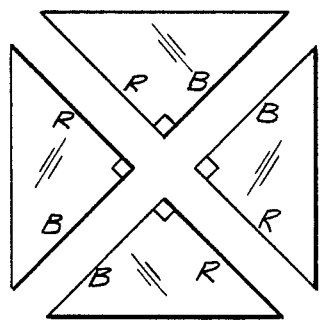
FIG. 3B is a schematic view depicting the constitution of the cube prism utilized in the present invention.

Reference is now made to FIGS. 3A and 3B in order to describe the construction of the cube prisms utilized in the present invention. As marked by the letters R and B, layers of red reflection and blue reflection of a dichroic mirror are deposited and sputtered on the two sides of the right angle of rectangular prism 20. Four such prisms are utilized using Canada Balsam or other suitable bonding materials with a refractive index of between about n=1.52 to 1.54.

Figure 4:
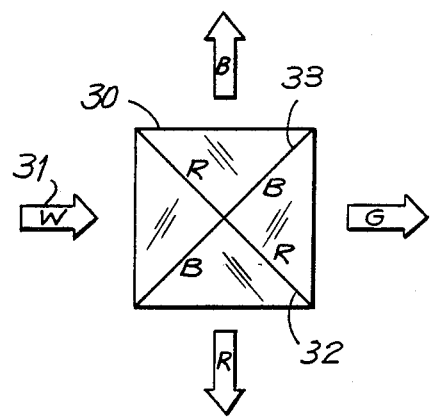
FIG. 4 is a graphic depiction showing the concept of color separation in the cube prism utilized in the present invention.

Referring to FIG. 4, the color separation performed by the cube prism will be described. Light 31 is perpendicularly directed to the surface of prism 30 and color is separated into three primary colors of red (R), blue (B) and green (G) by the selective reflection layers 32 and 33.

Figure 5A:
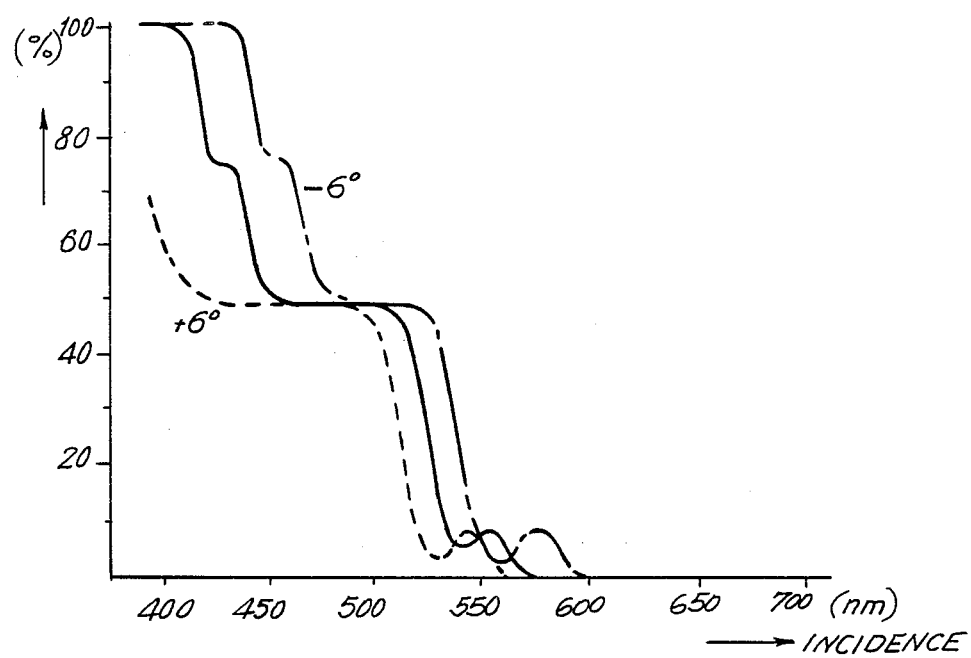
FIGS. 5A and 5B are graphs depicting the spectroscopic characteristices in random light incidence when light is transmitted at random into the cube prism.
Figure 5B:
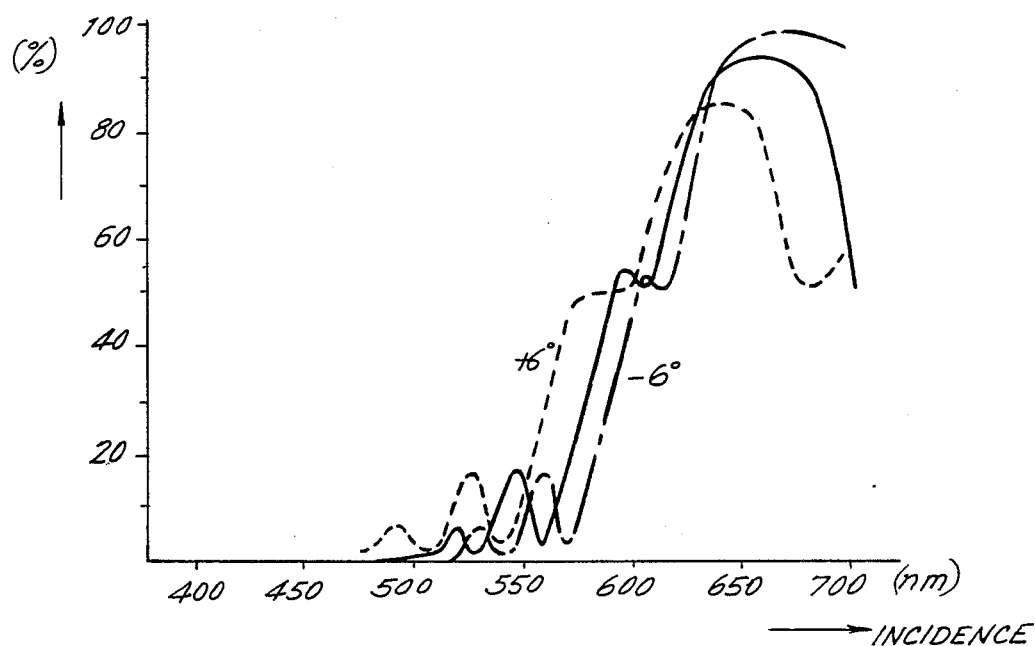

FIG. 5A shows the spectroscopic characteristics of the blue reflection to the incident light and FIG. 5B is a graph showing the spectroscopic characteristics of the red reflection to the random polarized light. When the light axis is shifted ±6° to the red reflection surface 32, in the incident light to the cube prism 30, the transmissive center value of the band width will be shifted approximately 50 nm. When the light axis is shifted ±6° to the blue reflection surface 33, the transmissive center value of the band width will also be shifted approximately 100 nm.

Figure 6A:
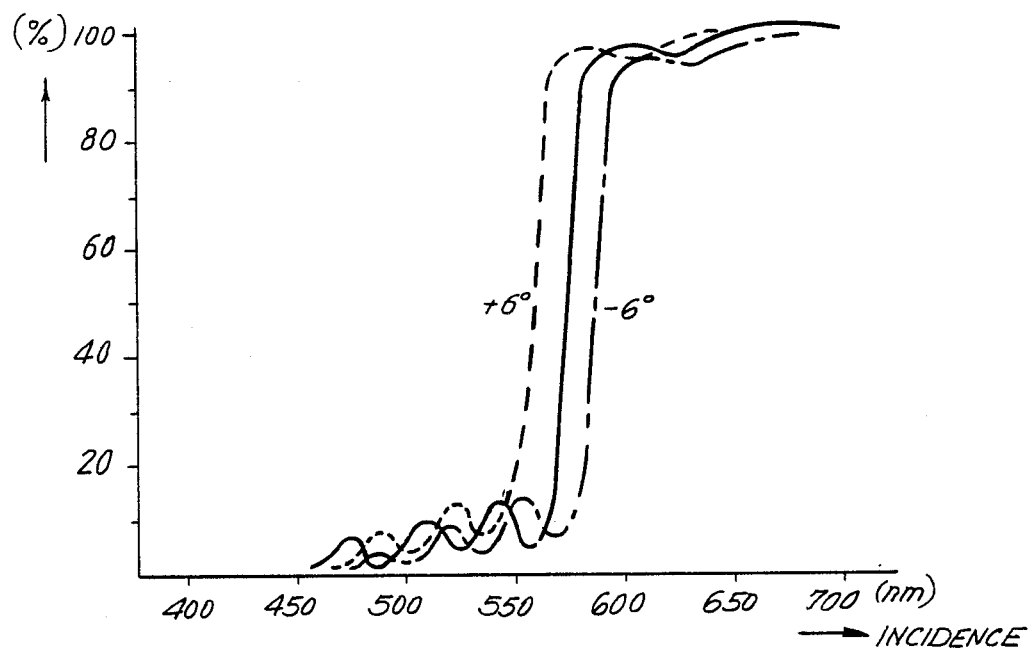
FIGS. 6A and 6B are graphs depicting the spectroscopic characteristics of S polarization incidence in color separation of the cube prism according to the present invention.
Figure 6B:
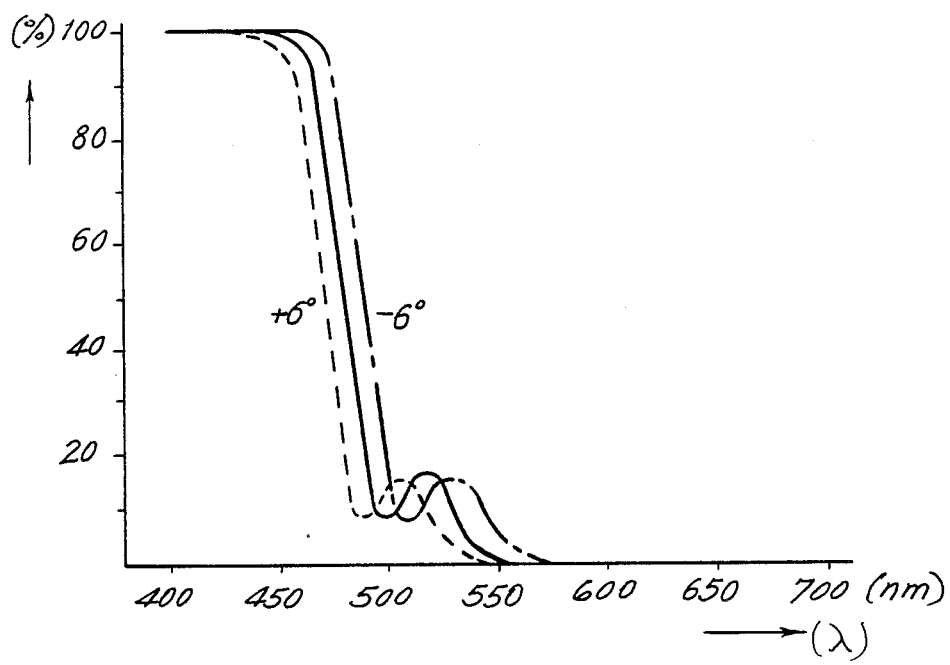

FIGS. 6A and 6B show the spectroscopic characteristics in the S polarization incidence perpendicular to the incidence surface of the color separation cube prism. FIG. 6A shows the spectroscopic characteristics of the red reflection at S polarization incidence and FIG. 6B shows the spectroscopic characteristics of the blue reflection at S polarization incidence. If incident light is limited to the S polarization element, the band width is less than 25 nm when the light is shifted ±6°.

Referring to FIG. 7 it is seen that light from light source 40 is collimated by condenser lens 41 and the incident light is transmitted to the red and blue reflection surfaces of the color separation cube prism 43 at 45° through polarizer 42. The polarization axis of polarizer 42 is perpendicular to the incidence surface (S polarization). Light is separated into red or blue on each selective reflection surface.

The separated colored lights are reflected by mirror 44 and the incident light is perpendicularly directed into light valve 45. Polarizer 46 on the emission side is at 45° to the red and blue reflection surface of color synthesis cube prism 47. Polarizer 46 is adhered to the emission side of the light valve so that its polarizer axis may be perpendicular to the incident surface.

Light valve 47 is located on the same focal distance to the projection lens 48.

Referring to FIG. 8 it is seen that the condenser lens and heat prevention filter are combined in light source member 50. A cut portion is provided on both color separation prism 51 and color synthesis prism 52 which are guided by props 53. The prisms are fixed by a side board 54 only one of which is depicted in FIG. 8.

Accordingly, four rectangular cube prisms are combined so that they can protect the dichroic reflecting surface. The incidence surface is coated for preventing reflection so that collimated light from the light source is effectively utilized. Since light of the S wave is incident, the color separation color characteristics are also sharp. Mirrors are adhered to mirror guide 55 and directs the light from the color separation prism to the color synthesis prism.

Light valves 56 are adhered to the three sides of the color synthesis cube prism 52 and fixed by adjustable guides. Projection lens 57 is fixed to a supporting board 58 by means of screws to complete the projection optical system. A simple and small projection optical system is realized by providing a circuit board parallel to side board 54.

Figure 9:
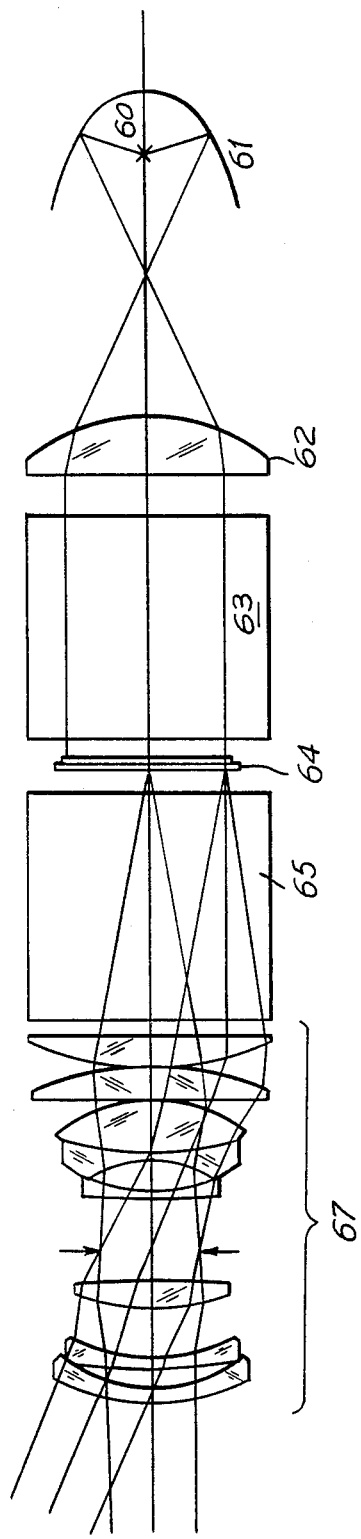
FIG. 9 is a side view depicting the light guide way of light in a projection-type color display device in accordance with the present invention.

FIG. 9 depicts the light guiding way according to the present invention. Light from light source 60 is at once focused by reflecter 61 and collimated into a parallel beam, thus providing a telecentric illumination system. The light is then transmitted through color separation cube prism 63, light valve 64 and color synthesis cube 65 and is thereafter projected on a screen by the projection lens group 67.

The specifications of the projection lens (retro-focus lens) are as follows:

f=32 mm
f=2.0
Bf=60 mm
Vignetting=100%
MTF=above 80% at 20 line/mm

Figure 10:
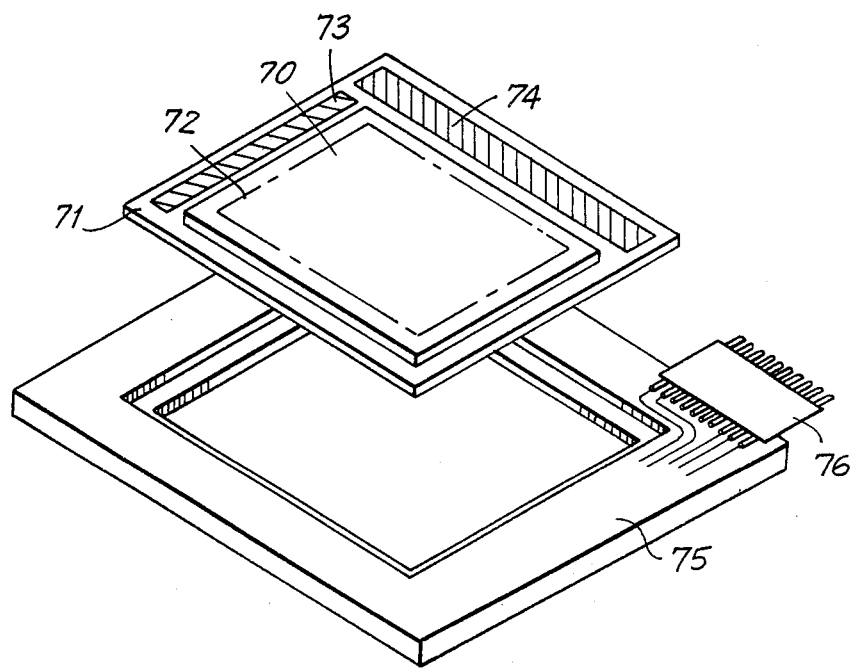
FIG. 10 is an exploded perspective view showing the method of mounting the light valve.

FIG. 10 depicts the method in which the light valve is mounting according to the present invention. A liquid crystal material is filled between upper substrate 70 and lower substrate 71 of the liquid crystal light valve (approximately 4 to 10 $\mu$m).

A transparent electrode as the common electrode is formed on upper substrate 70 and polisilicon TFT and a transparent electrode are formed on lower substrate 71. Sealing spacer 72 is located between upper substrate 70 and lower substrate 71.

Gate lines and source lines are coupled on lower substrate 71 in an X-Y matrix array. A line driver is required for such lines. In the present embodiment, the supporting substrate 75 where gate line driving circuit 73 and source line driving circuit are formed, are formed using TFT on lower substrate 71.

Lower substrate 71 is recessed into supporting substrate 75 so that their surfaces will be flat. Supporting substrate 75 is electrically coupled to the liquid crystal light valve and glued by wires such as An, Al, Cu, and communicates with an auxiliary device through connector 76. Such a mounting method provides an extremely thin light valve, thereby making the mounting easy.

The driving method of the light valve conforms to the driving method disclosed in the article beginning at page 211 in Nikkei Electronics No. 351 is published in 1984.

Figure 11:
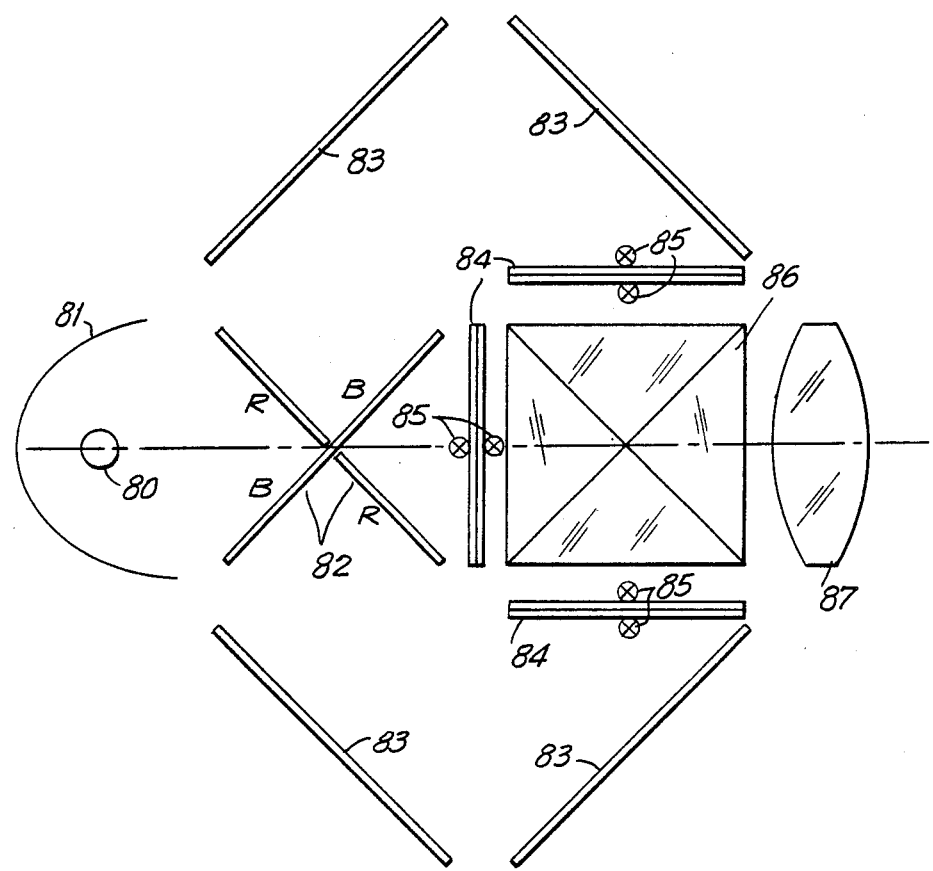
FIG. 11 is a top schematic view showing the configuration of a projection-type color display device where color is separated by a dichroic mirror.

FIG. 11 depicts the projection-type color display device where color is separated using a dichroic mirror group. Light from light source 80 is collimated so that it is separated in colors by dichroic mirror group 82. Each separated color will be reflected on light valve 84 by reflection mirror 83. Light is modulated conforming to the electrode, and light valve 84 forms an image using a polarizer with parallel polarizing axis 85. Color synthesis cube prism 86 synthesizes the colored lights of the three primary colors, red, blue and green, and projects the image on a screen through a projection lens 87. By combining the red reflection surface and blue reflection surface of dichroic mirrors in the shape of an X as described above, a compact system can be realized.

Figure 12:
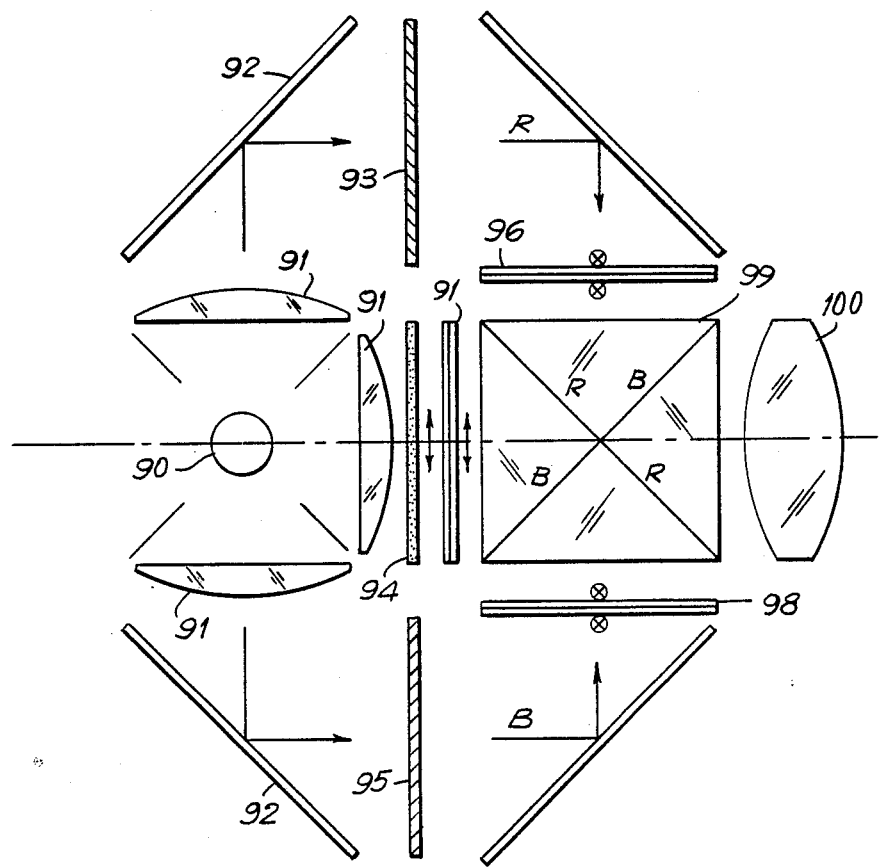
FIG. 12 is a top schematic view of a projection-type color display device where color is separated through color filters.

FIG. 12 depicts the projection-type color display device in the present embodiment where color is separated through color filters. Light from light source 90 is practically collimated by condenser lens 91 provided on each of three directions, is thereafter reflected by mirror 92 and is thereafter transmitted into blue filter 93, green filter 94 and red filter 95. Each respective transmitted light is directed into blue light valve 96, green light valve 97 and red light valve 98, and then such light is modulated. An image is created by color synthesis cube prism 99 and projected onto a screen through projection lens 100.

According to this construction, such illumination system which has improved the light foucsing efficiency has been realized and high light utilization efficiency can be acquired using the selective transmission-type dichroic mirrors.

As described above, the present invention makes it possible to organize the projection light system including transmissive light valves and a color separation member with high light utilization efficiency. Accordingly, a much more brilliant image can be provided. In addition, by combining the reflection surfaces of color synthesizing cube prisms having two kinds of selective reflection characteristics in the shape on an X, synthesis of the three colors whose back focus length, are the same, can be provided. Accordingly, a much more compact projection light system can be designed.

Further, variation of the brightness in the projected image can be limited within 10% by adopting a telecentric illumination system as the projection light source and a retro-focus lens as a projection lens where the periphery is darker than the center. Accordingly, an image with more uniform brightness than one used in the conventional CRT projection method can be provided.

Although light-valves use the TFT matrix panel, the fine structure of the electrodes makes it possible to lower the picture size up to approximately 30 μm as well as to design a much more precise display device. Further, the present invention does not require convergence adjustment contrasted to the Brown Tube Projection Method, and picture elements in an X-Y matrix can be constituted. Therefore, resolution in character display will not cause problems such as any blur in characters so that the light-valves may be used in CAD or CG.

According to the present invention, light is collimated and forwarded by a telecentric illumination system so that the polarizer axis is adjusted for the incident S wave of light. Light is separated into three primary colors of red, green and blue, and guided to the transmissive light valve without losing the polarized S wave component of incident light. Thereafter, the images formed by the transmissive light valve and the color light is modulated. The surface of the transmissive light valve is coded to prevent the reflection of light, thus increasing the transmissive light efficiency and improving the contrast of the projected image. Contrast of the factor of 1:30 can be obtained by using an image display panel which makes use of the electrical optical effects of LCD.

In LCD light valves, light of the S wave is directed incident into three colored panels. It is thereafter transmitted through the reflecting surface when a voltage is selectively applied, and it is not transmitted when the voltage is not applied.

The color synthesis cube prism has the same selective reflection characteristics as the color separation cube prism. Colored lights of red, green and blue are synthesized and images are projected on the screen by a retro-focus lens whose back focus is substantially longer than focus f. Thus, the screen will become white if all three light valves are selectively transmissive. Therefore, the separation ability of the colored light of the cube prism becomes high by the S polarization element of the incident light. Light energy can be effectively utilized by separating, modulating and synthesizing the colored light.

Also, by adopting the retro-focus lens, the projection lens with a short focal distance and small f value can be achieved. By shortening the projection distance, a projection-type display which can be seen both in front of and at the back of the screen can be realized. Further, the retro-focus lens designed to have a short focal distance is more advantageous for shortening the length of the lens.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A projection-type color display device comprising a light source for producing light, collimating means for collimating said light, color separation means for receiving said light and for separating said received light into the different colors of red, blue and green light, transparent liquid crystal light valve means for receiving said red, blue and green transmissive light and for modulating said light, a color synthesis cube prism having a reflecting surface for synthesizing said three monochromatic lights modulated by said light valve means, said transparent liquid crystal light valve means and said reflecting surface of said color synthesis cube prism each having a polarizing axis, said polarizing axis of said transparent liquid crystal light valve means being coincident with the polarizing axis of the color synthesis cube prism, and retro-focus projection lens means for projecting said synthesized image.

2. The projection-type color display device as claimed in claim 1, wherein said light valve means includes an active matrix panel having a thin film transistor (TFT).

3. The projection-type color display device as claimed in claim 1, further comprising first and second polarizers, said light valve means being positioned intermediate said first and second polarizers, the polarization axis of said first and second polarizers being adjusted for the incident S wave of light which is vertical to the light incident surface of said color synthesis cube prism.

4. The projection-type color display device as claimed in claim 1, wherein said color synthesis cube prism is composed of four rectangular cube prisms, dielectric films with first and second types of selective reflection characteristics being formed on the two perpendicular surfaces of each of said four rectangular prisms.

5. The projection-type color display device as claimed in claim 1, wherein said retro-focus projection lens means includes a lens in which the back focus distance Bf is longer than the focus distance f.

6. The projection-type color display device as claimed in claim 1, wherein said color separation means includes a blue color filter, a green color filter and a red color filter.

7. The projection-type color display device as claimed in claim 1, wherein said color separation means includes a dichroic mirror group.

8. The projection-type color display device as claimed in claim 1, wherein said color separation means includes a color separation cube prism.

9. The projection-type color display device as claimed in claim 1, wherein said light valve means includes a first light valve for receiving said red light, a second light valve for receiving said blue light and a third light valve for receiving said green light.

10. The projection-type color display device as claimed in claim 1, wherein said transparent liquid crystal light valve means includes a substrate, and a peripheral line driver including a thin film transistor formed on said substrate.

11. The projection-type color display device as claimed in claim 1, wherein said collimating means includes a condenser lens and an oval-type reflection mirror.

12. The projection-type color display device as claimed in claim 1, wherein said retro-focus projection lens means has 100% vignetting.

* * * * *